United States Patent [19]

Christenson

[11] Patent Number: 5,516,135
[45] Date of Patent: May 14, 1996

[54] TAG AXLE LATCHING MECHANISM

[75] Inventor: Ronald E. Christenson, Parsons, Tenn.

[73] Assignee: McNeilus Truck and Manufacturing, Inc., Dodge Center, Minn.

[21] Appl. No.: 455,839

[22] Filed: May 31, 1995

[51] Int. Cl.⁶ .............................. B60P 1/00; B62D 61/12
[52] U.S. Cl. ................... 280/405.1; 180/24.02; 280/81.1; 280/704; 280/711; 280/DIG. 1; 298/1 R; 298/22 P; 298/23 R
[58] Field of Search .................. 180/24.02; 280/81.1, 280/405.1, 704, 711, DIG. 1, 43.23, 404; 298/22 P, 23 R, 23 S, 1 R

[56] References Cited

U.S. PATENT DOCUMENTS

| 3,272,552 | 9/1966 | Park | 296/56 |
|---|---|---|---|
| 3,440,763 | 4/1969 | O'Brien | 296/56 |
| 3,757,969 | 9/1969 | Smith | 296/56 |
| 3,873,149 | 3/1975 | Churchman | 296/56 |
| 4,307,541 | 12/1981 | Farmer et al. | 296/56 |
| 4,940,289 | 7/1990 | Ritchie | 280/81.1 |
| 5,018,755 | 5/1991 | McNeilus et al. | 280/81.1 |
| 5,141,280 | 8/1992 | Gerrard | 296/56 |
| 5,335,958 | 8/1994 | Christenson et al. | 296/56 |

*Primary Examiner*—Mitchell J. Hill
*Attorney, Agent, or Firm*—Haugen and Nikolai

[57] ABSTRACT

A tag axle latching mechanism is disclosed that includes opposed matching engaging components wherein a first is attached to a tag axle system and a second is attached to a truck frame. The components cooperate to direct supporting forces associated with the tag axle system through the truck frame. The tag axle system is mounted on a tailgate such that the engaging components are aligned as the tailgate is operated between a closed and an open position. The tag axle system is connected to the tailgate such that it is covered by the tailgate but forces associated with support provided by the tag axle system are not transferred to the tailgate.

31 Claims, 19 Drawing Sheets

TAG AXLE LATCHING MECHANISM

BACKGROUND OF THE INVENTION

1. Field of the Invention

This invention relates generally to latching mechanisms associated with tag axles for vehicles and, more particularly, to a latching mechanism for latching a tailgate mounted tag axle to a vehicle frame.

2. Discussion of the Related Art

Auxiliary axle assemblies or tag axles augment the load carrying capabilities of load hauling vehicles. Tag axle assemblies carry wheels which may be deployed to a ground engaging position or raised to a stowed position. In the ground engaging position, a tag axle system provides an additional supporting axle to redistribute the weight carried by the vehicle among the axles. This additional axle can be employed to increase the weight carrying capability of the vehicle and yet keep it within a per axle legal weight restriction imposed by the state or federal government. In some types of vehicles, such as rear discharging refuse trucks, a rearward directed load distribution predominates and it is advantageous to provide tag axle support as far rearward as possible.

Rear mounted tag axle systems may be attached to the frame or chassis of a vehicle or in a rear discharge vehicle, even to the tailgate. In some applications, a conventional frame mounted tag axle system would interfere with rearward unloading operations. To overcome this difficulty, the tag axle may be carried by or suspended from the tailgate so as to swing up and out of the way with the tailgate when the vehicle unloads. However, conventional tailgate hinges and latches are not built to carry the weight of or withstand the truck supporting forces associated with a ground engaging tag axle system and may pop open or fail during use.

Examples of tailgate hinges and latches may be found in U.S. Pat. Nos. 4,307,541, 3,440,763 and 3,272,552 which describe tailgate latching mechanisms including a latch or pin connected to a pivoting mechanical linkage which is, in turn, attached to a corresponding hydraulic cylinder. As the cylinder is operated, the linkage pivots to open or close the tailgate latch. The tailgate pivots open or closed from hinges situated at the top of the vehicle body.

More examples can be found in U.S. Pat. Nos. 5,141,280, 3,873,149 and 3,757,969 which describe tailgate latching mechanisms wherein the tailgate is hung from vertically displaceable hinges. In each of these patents, hydraulic cylinders lift the tailgate vertically from a closed and latched position before swinging the tailgate open.

Similarly, in U.S. Pat. No. 5,335,958, issued to Christenson (the inventor in this application) et al and commonly assigned with the present invention, hydraulic cylinders raise the tailgate to unlock interlocking side latches before swinging the tailgate open. The latching mechanism described includes a pair of self-aligned vertical stops to prevent vertical displacement of the tailgate when closed. The vertical stops are automatically disengaged as the hydraulic cylinders extend to open the tailgate.

There remains however a need in the art to provide a tailgate mounted tag axle system that does not require the tailgate to carry the full supporting force associated with a deployed tag axle system. Such a system would preserve the advantage associated with a tailgate mounted system while eliminating the drawback associated with supporting forces.

OBJECTS

It is accordingly a principal object of the present invention to provide a latching mechanism which can withstand the supporting forces associated with a tag axle system.

A further object of the invention is to provide a tag axle latching mechanism associated with a tag axle suspended from a tailgate.

Another object of the invention is to provide a tag axle latching mechanism which directs the supporting forces associated with a tailgate mounted tag axle through the frame of the vehicle.

Yet another object of the invention is to provide a tag axle latching mechanism for latching a tailgate mounted tag axle system to the frame of a vehicle including means for preventing vertical displacement of the tailgate.

Still another object of the invention is to provide a tag axle latching mechanism associated with a tag axle suspended from a vertically displaceable tailgate and including a positive stop device for securing the tag axle to the frame of the vehicle and preventing vertical displacement of the tag axle latching mechanism and tailgate.

A still further object of the invention is to provide a tag axle latching mechanism associated with a tag axle suspended from a vertically displaceable tailgate and including a positive stop for preventing vertical displacement of the tag axle and tailgate such that the supporting forces associated with the tag axle system in the ground engaging position are directed entirely through the frame of the vehicle.

Other objects, features and advantages of the present invention will become apparent to those skilled in the art through familiarity with the summary of the invention, detailed description, claims and drawings herein.

SUMMARY OF THE INVENTION

The foregoing objects of the present invention are attained by providing a tag axle latching mechanism which generally includes opposed matching engaging means or interlocking components attached to the frame of the vehicle and to the tag axle. The interlocking components are operated between a latched position and an open position. In the latched position, a positive vertical stop prevents substantial vertical movement of the interlocking components and directs forces from a ground engaging or stowed tag axle system to the frame mounted component and the frame of the vehicle. The tag axle is carried by but loosely suspended from the tailgate, i.e. mounted with sufficient play, such that in the latched position no forces are transferred from the tag axle latching mechanism to the tailgate. In the open position, the tag axle hangs from the tailgate to be lifted with the tailgate for unloading the vehicle. A latching mechanism of this type is attached to each side of the load hauling vehicle for securing the tag axle to the vehicle. The mechanism may be characterized by a variety of embodiments.

In one embodiment of the present invention described and shown herein, two vertically aligned and spaced upward facing hooks are securely mounted to the frame of the vehicle to interlock with two vertically aligned and spaced downward facing hooks fixed to the tag axle assembly. A lock pin inserted between the lower tag axle mounted hook and the top frame mounted hook secures the hooks together. In the tag axle ground engaging position, forces from the tag axle wheel are transferred from the tag axle hooks through the lock pin and the frame mounted hooks to the truck frame.

The tag axle is suspended from the frame mounted hooks on the tailgate. The tag axle assembly is loosely mounted or suspended, such as with bolts through over-sized holes, on the lower end of the tailgate such that the tag axle is sufficiently adjustable on the tailgate mount so that in the latched position, supporting forces associated with the tag axle are not applied to the tailgate, but may be diverted to the frame of the truck by the latching mechanism.

In another embodiment, a beveled socket is attached to the vehicle frame and a corresponding tongue is attached to the tag axle. The tongue and socket are operated between an inserted or latched position and an open position. The socket has a mouth or entrance which widens to a maximum width in an inner cavity which narrows to a minimum width and widens thereafter. The tongue has a tip which narrows to a minimum width and widens to a maximum width in a tongue base which narrows thereafter and attaches to the tag axle. In operation, the tongue tip fits past the inner cavity minimum width and the tongue base fits past the socket mouth. In the latched position, the tip and inner cavity minimum widths and the tongue and socket maximum widths correspond such that in the ground engaging position, forces from the tag axle wheel skew the top of the tag axle tongue base and the bottom of the tongue tip against the frame mounted socket to lock the tongue in place. In the latched and stowed position, the tag axle hangs on the frame mounted socket such that the bottom of the tongue base and the top of the tongue tip lock the tongue in place and transfer forces to the frame mounted socket and the frame. The tag axle is loosely mounted to the tailgate, such as with a bolt attached to the tag axle and projected through a slot in a tailgate mounted support bar. In the latched position no forces are transferred to the tailgate and in the open position the tag axle hangs on the tailgate to be lifted with the tailgate for unloading the vehicle.

In the embodiments described herein, the tailgate is a vertically disposed tailgate which is pivotally connected to the truck body with vertically displaceable hinges. The tailgate includes vertically spaced upper and lower pairs of side latches which fit into corresponding latches attached to the truck body. From the closed position, the tailgate is displaced or lifted vertically to clear the latches before being swung open. A latching link member which is pivotally connected to the truck body prevents vertical displacement of the tailgate in the closed position. A pair of hydraulic cylinders attached to the tailgate and the latching link member operate the tailgate. Extending the hydraulic cylinders pivots and unlocks the latching link member, vertically displaces the tailgate and swings it open. Such a tailgate latching system is further described and shown in the above-referenced U.S. Pat. No. 5,335,958, the disclosure of which is hereby incorporated by reference for any necessary purposes. Embodiments of the tag axle latching mechanism described herein are compatible with that tailgate but, of course, other tailgates would also function and a vertically displaceable tailgate is not required.

In a vertically displaceable tailgate and hook and lock pin combination, the tag axle hooks align with the frame mounted hooks and the tailgate drops vertically to interlock the hooks. The tag axle assembly is held securely in place by the interlocking hooks and the lock pin which retains the hooks in the interlocked position and prevents vertical displacement. The tailgate is held securely in place to withstand horizontal refuse compacting or packing forces by the tailgate upper and lower pairs of side latches and hoops or stirrups and spurs attached to the lower end of the tailgate and the truck frame. Lifting the tailgate vertically lifts the tag axle and unlatches the tag axle hooks from engagement with the frame hooks. An interlock may be provided to assure that the tag axle lock pin is disengaged before the tailgate is operated.

In the tongue and socket embodiment as used with a vertically displaceable tailgate, the tag axle hangs from an open tailgate such that the tongue aligns with and is received into the socket as the tailgate swings shut. The tag axle bolt slides in the support bar slot as the tailgate is vertically lowered to latch the tailgate into place. The tag axle hangs from the socket by the tongue in the latched position. Lifting the tailgate slides the bolt to the bottom of the slot to support the weight of the tag axle assembly and unload the weight of the tag axle assembly from the tongue and socket joint.

The tag axle system may be of any variety, including steerable stub axles mounted on independent pivots or a single through-axle type which may also be steerable. In example embodiments described herein, a through axle system is described mounted to the tailgate of a front loading refuse truck. The through axle is operated by either pneumatic springs or a double-acting hydraulic cylinder. Of course, on certain vehicles, such as rear loading refuse trucks, the dimensions of the tailgate may dictate the use of stub axles. The vehicle may be any vehicle having a tailgate, including side loading or rear loading refuse trucks.

DETAILED DESCRIPTION

Figure 1:
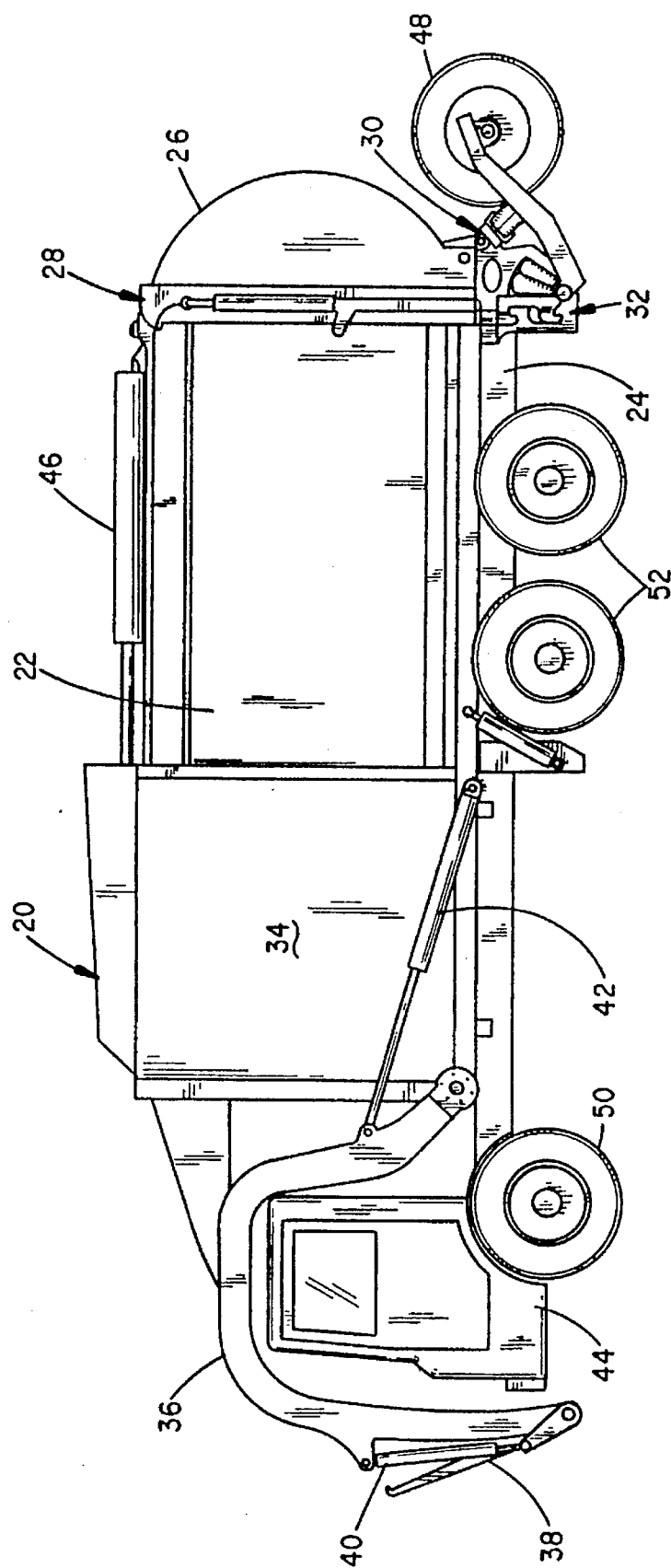
FIG. 1 is a side view of a front loading refuse truck including a tag axle latching mechanism of the present invention and showing a tag axle system in the stowed position.
Figure 2:
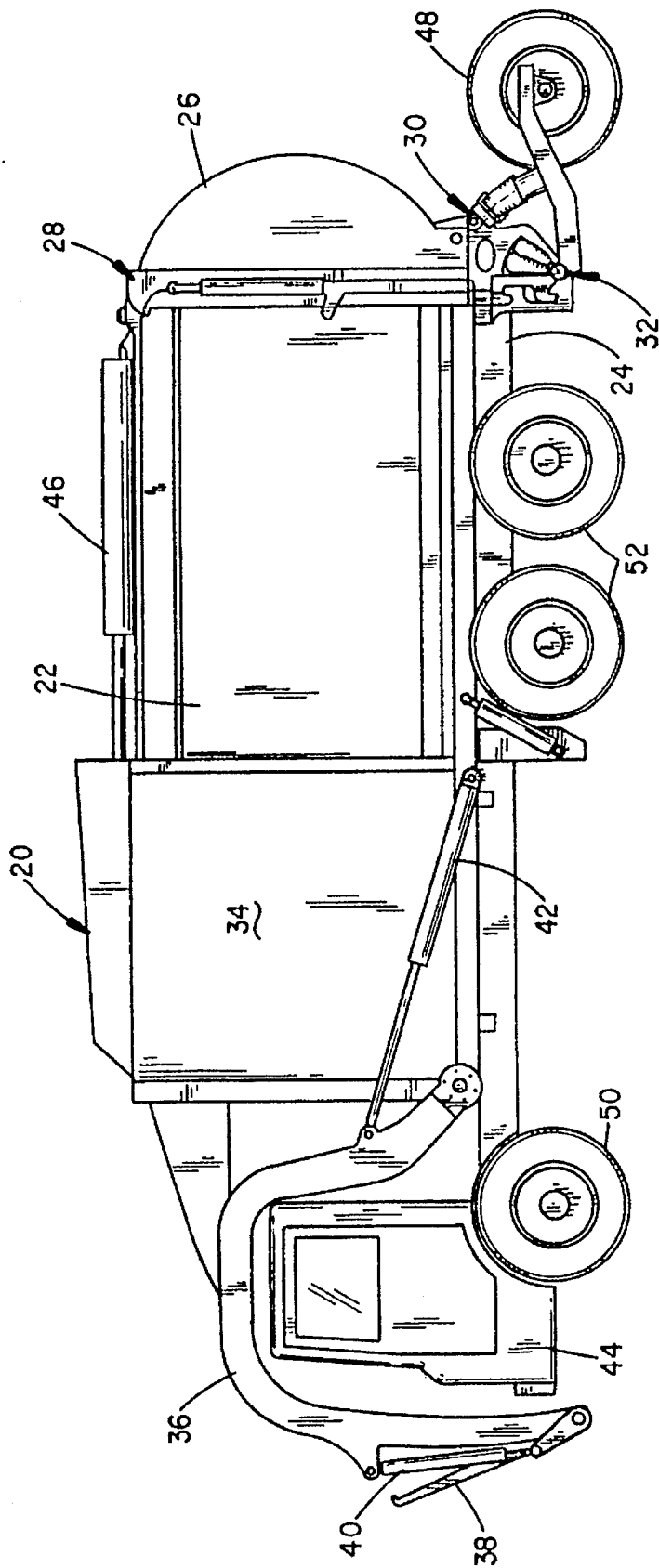
FIG. 2 depicts the truck of FIG. 1 with the tag axle system in the ground engaging (deployed) position.
Figure 3:
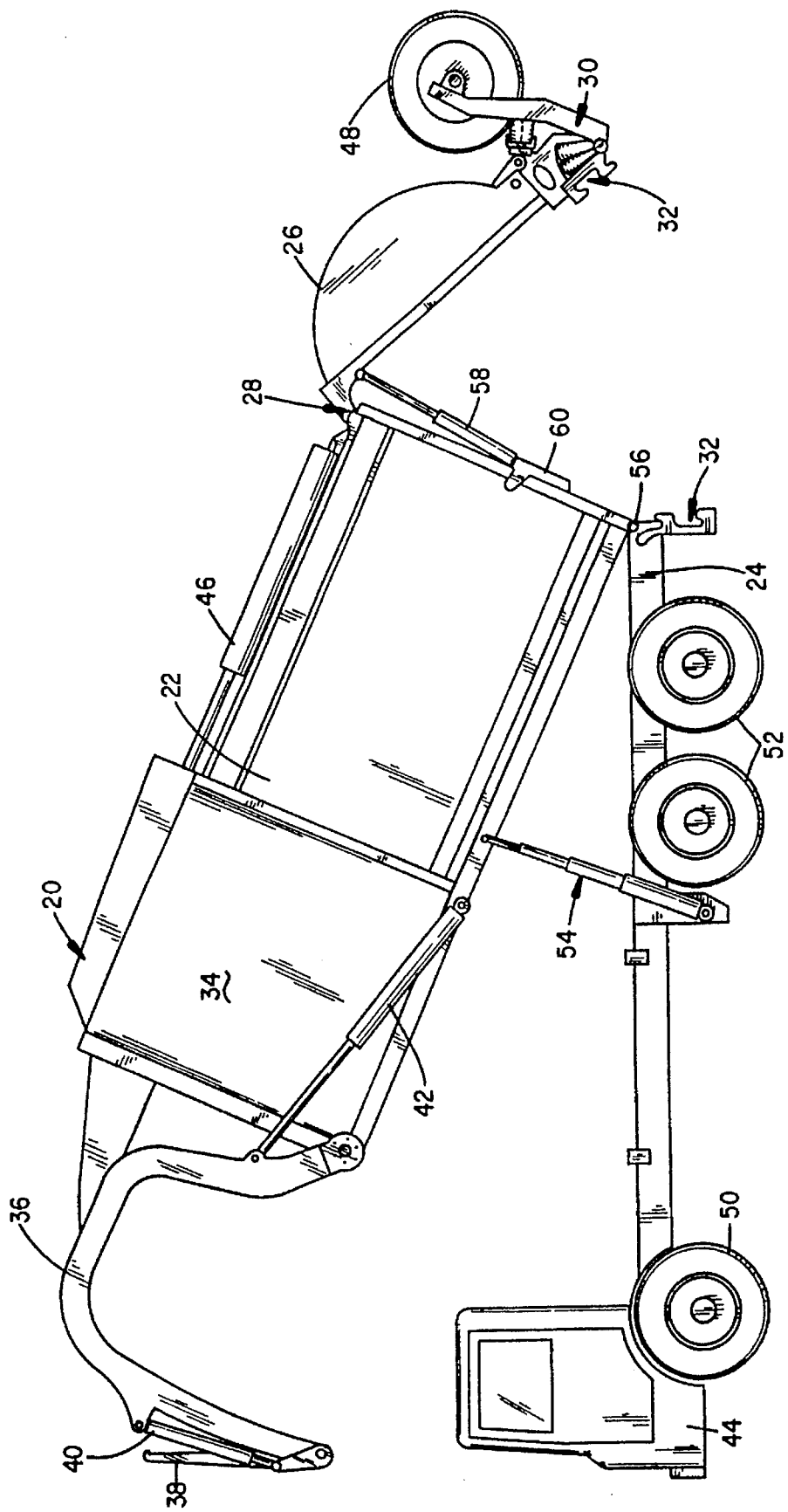
FIG. 3 depicts the truck of FIG. 1 showing the tag axle system in the stowed position and the tailgate and body raised as for unloading.

Shown in FIGS. 1–3 is one side of a front loading refuse truck 20 which includes a truck frame or chassis 24 and a tag axle latching mechanism in accordance with the present invention, indicated generally by the numeral 32. The latching mechanism 32 detachably connects a tag axle 30 to the truck frame 24. The truck 20 includes a material holding body 22 and a refuse hopper 34 mounted on the truck frame 24. The tag axle 30 is adjustably connected or loosely mounted to the lower end of a large tailgate 26 which has an arcuate outer metal skin and is pivotally connected to each side of the body 22 at the top thereof by a pair of spaced hinge mechanisms 28. The truck includes a pair of heavy lift arms 36 pivotally attached to the refuse hopper 34 of the truck body. A refuse box engaging means or forks 38 are pivotally attached to the lift arms 36 and lift and dump cylinders 42 and 40 operate to lift refuse boxes over a forward cab section 44 and empty them into the refuse hopper 34. An horizontal hopper cover (not shown) is slidably engaged over the refuse hopper 34 and operated by hopper cover hydraulic cylinder 46. An hydraulically-operated packer blade (not shown) forces the hopper contents rearward into the body 22 to eventually compact it against the arcuate tailgate 26 in a well-known manner. Thus, the load is forced rearward in the refuse truck 20 and an amount of weight is shifted from the front wheels 50 to the rear wheels 52.

In FIG. 2, the tag axle assembly 30 is shown lowered to a ground engaging (or supporting) position which accommodates the increased weight aft and helps to redistribute the weight among all axles. The tag axle assembly 30 supports the rear of the truck 20 to help redistribute weight, reducing the load on the rear wheels 52 and restoring some of the load to the front wheels 50. As described below, the tag axle latching mechanism 32 assures that supporting forces associated with the ground engaging wheel 48 are applied through the truck frame 24 and not the tailgate 26.

As shown in FIG. 3, the body 22 can be raised to an unloading position by extending body lift hydraulic cylinder(s) 54 to pivot the body 22 at pivot(s) 56. The lift and dump mechanism 36 and the refuse hopper 34 may alternatively be configured to remain in place on the truck frame 24 or attached to be lifted with the body 22 into a raised position as shown. Tag axle assembly 30 is lifted with tailgate 26 which is opened by tailgate hydraulic cylinder 58. The tag axle 30 may be raised to the stowed position before the tailgate 26 is opened. Opening the tailgate 26 lifts the tag axle assembly 30 away from the opening and prevents interference with the unloading operation.

Figure 4:
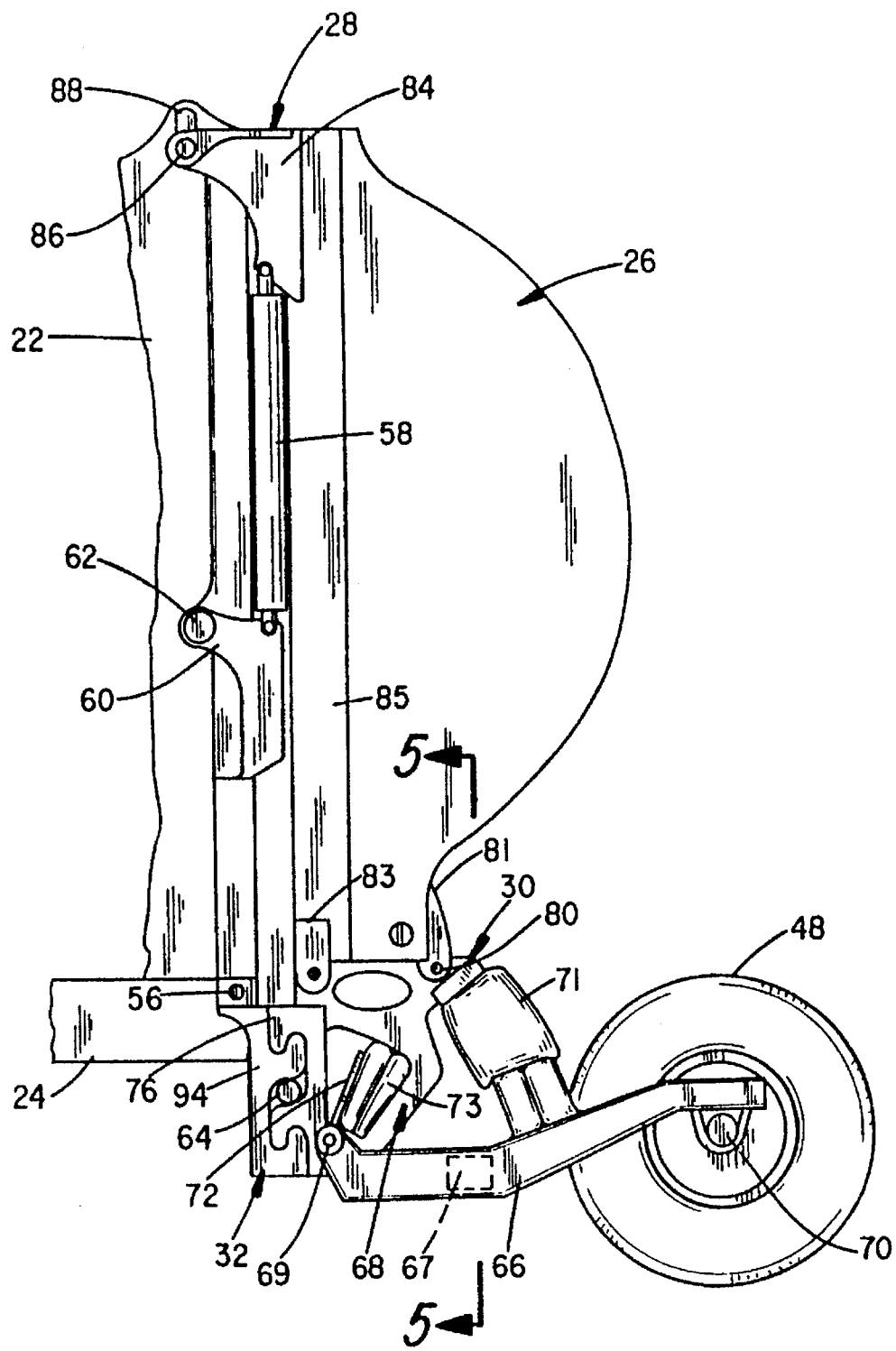
FIG. 4 is an enlarged fragmentary view of the rear of the truck of FIG. 2 showing portions of the tailgate latching mechanism and the hook and lock pin embodiment of the tag axle latching mechanism.

In one embodiment of the present invention, as shown in FIG. 4, the tag axle latching mechanism 32 includes a tag axle double hook 76 attached to the tag axle 30 and a frame mounted double hook 94 attached to the truck frame 24. The hooks 76 and 94 are locked into a closed or latched position by a lock pin 64 which is slidably inserted therebetween.

The tag axle 30 may be any type and as shown includes an axle mounting lever 66 pivotally attached to a tag axle frame 68 at a lever arm pivot 69. The axle mounting lever 66 carries the wheel 48 on a through axle 70 which is connected to axle mounting levers situated on each side of the refuse truck 20. A cross tube member 67, (FIG. 5), is attached to the axle mounting levers situated on each side of the truck 20 for moving the axle mounting levers together. Fluid operated actuators 71 and 73, which may be pneumatic springs or bellows, move the axle mounting lever 66 between the deployed position, FIGS. 2 and 4, and the stowed position, FIGS. 1 and 3. Lowering pneumatic spring 71 is connected to the tag axle frame 68 and the axle mounting lever 66 to force the wheel 48 into the ground engaging position as it expands. Torque lever arm 72 is securely attached to the axle mounting lever 66 to pivot therewith and raising pneumatic spring 73 is attached to the torque lever arm 72 and the tag axle frame 68 to raise the wheel 48 as it expands.

As shown in FIG. 4, the tailgate 26 includes a peripheral steel frame 85 having heavy gusset-like hinge members 84 attached thereto and pivotally connected to the body 22. Tailgate hinge pins 86 ride in vertically slotted openings 88 situated on each side of the refuse truck 20 at the top of the body 22. The tailgate hydraulic cylinders 58 are pivotally attached to hinge members 84 and latching link member 60.

Figure 5:
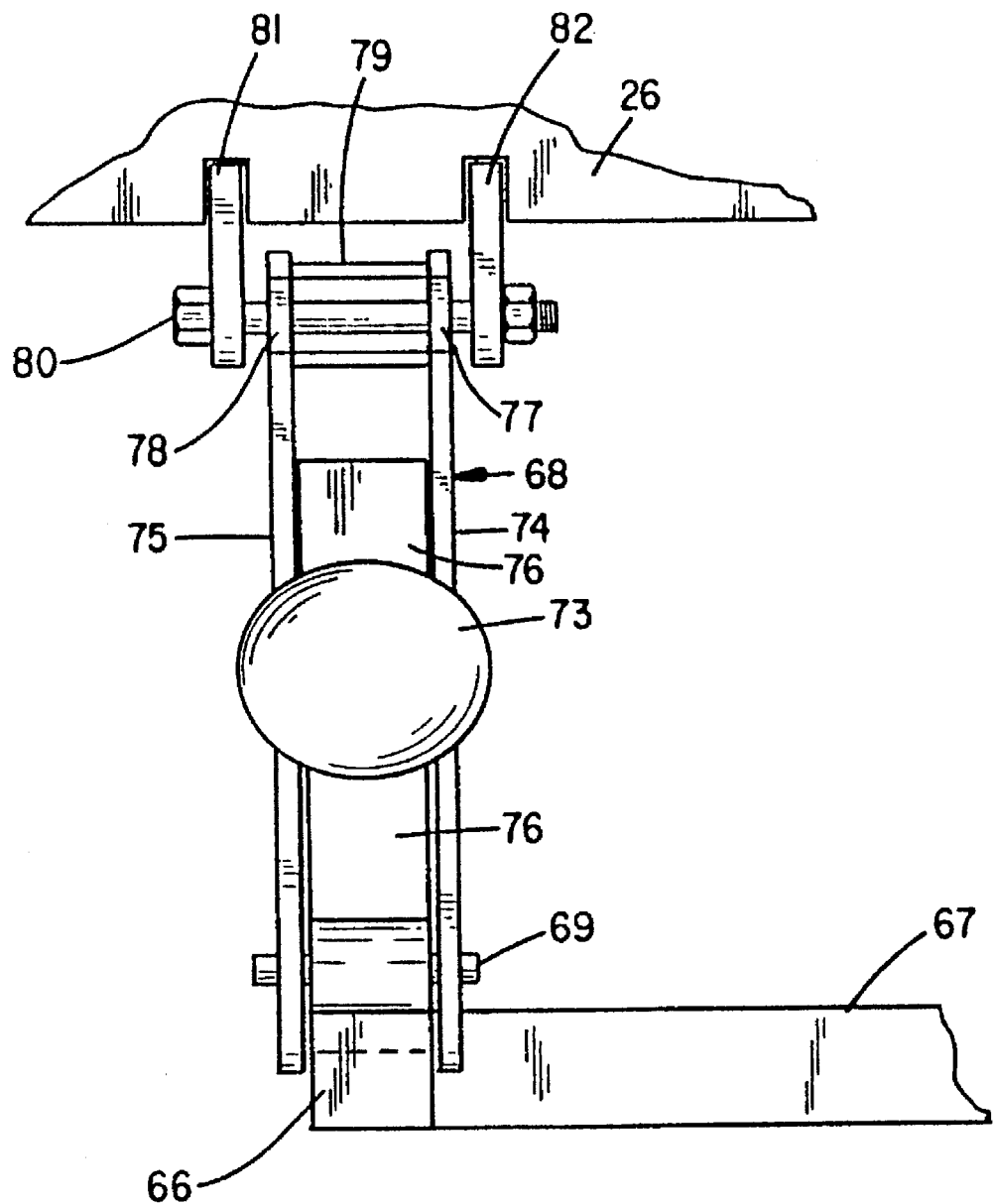
FIG. 5 is a greatly enlarged fragmentary detail rear view of one side of the truck of FIG. 1 taken along the line 5—5 of FIG. 4 showing the tag axle and tailgate mount.

As depicted in FIGS. 4 and 5, the tag axle frame 68 is adjustably connected to the tailgate 26 at first tag axle mounts 81 and 82, situated toward the rear of the lower part of the tailgate 26, and second tag axle mounts, indicated generally by 83, situated toward the front. The tag axle is mounted similarly at each set of mounts wherein the tag axle frame 68 is made up of two side pieces 74 and 75 securely attached, such as by welding, to a tag axle mounted double hook 76. The side pieces 74 and 75 extend above the double hook 76 and are provided with over-sized holes 77 and 78 at the top thereof. An over-sized tube 79 is secured, such as by welding, therebetween and tailgate tag axle mounts 81 and 82 are secured, as by welding, to the tailgate 26. A bolt 80 connects the tag axle frame 68 to the tailgate 26 through the over-sized holes 77 and 78 and the over-sized tube 79.

Figure 6:
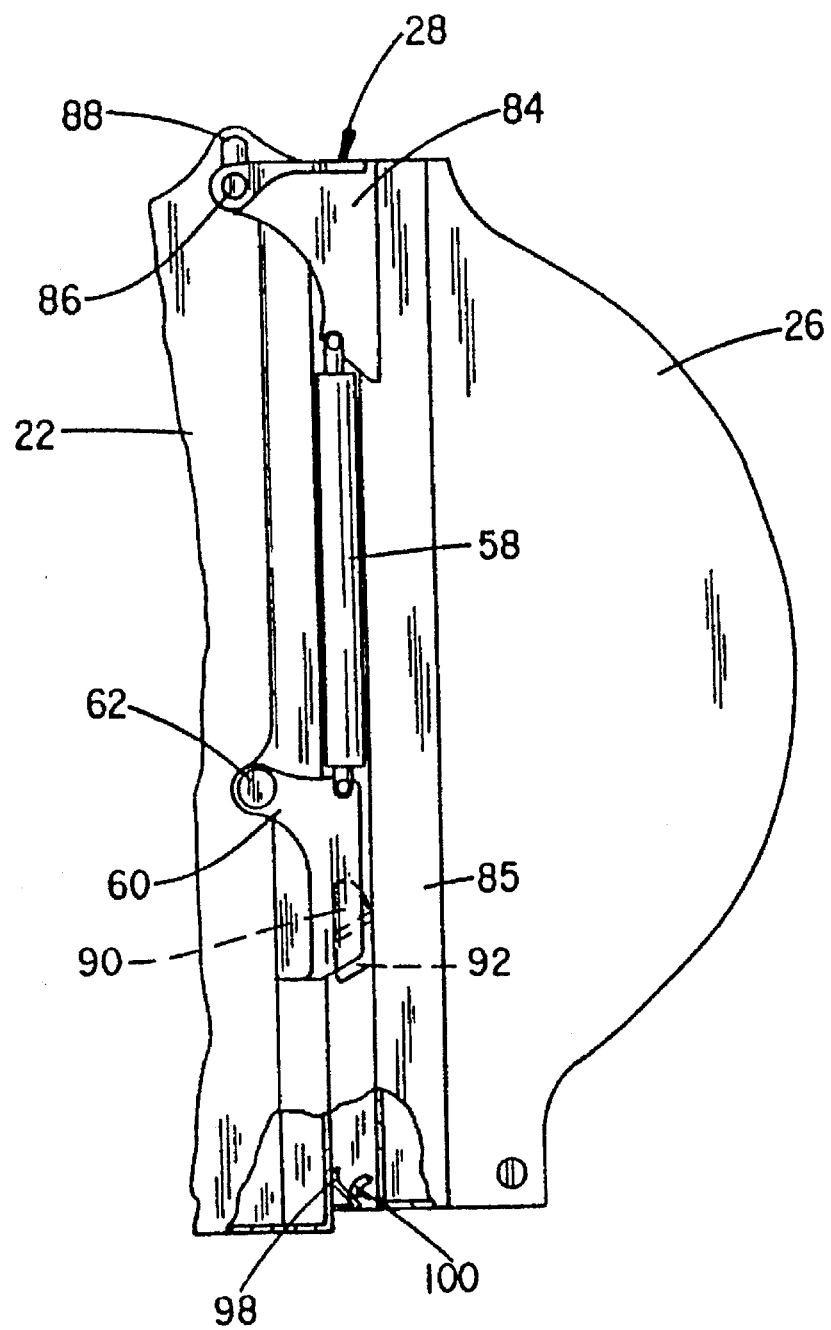
FIG. 6 is a greatly enlarged, partially cut-away, fragmentary side view of the tailgate of the truck of FIG. 1 without the tag axle system and latching mechanism showing the tailgate vertical stops in dashed lines and a hoop and spur.

As shown in FIG. 6, tailgate 26 is locked into position with latching link member 60 which is pivotally connected at pivot pin 62 to the body 22. The latching link member 60 includes a vertical stop 90 attached thereto for locking with a corresponding tailgate vertical stop 92 attached to the steel frame 85 of the tailgate 26. With the latching link member 60 in the vertical position, vertical stop 90 is directly above vertical stop 92 to prevent upward displacement of the tailgate 26. A plurality of hoops or stirrups 98 are attached to the lower end of the body 22 to interlock with spurs 100 attached to the tailgate frame 85. The stirrups 98 and spurs 100 assist in guiding the tailgate 26 into alignment for latching and maintain closure along the bottom edge of tailgate 26.

Figure 7:
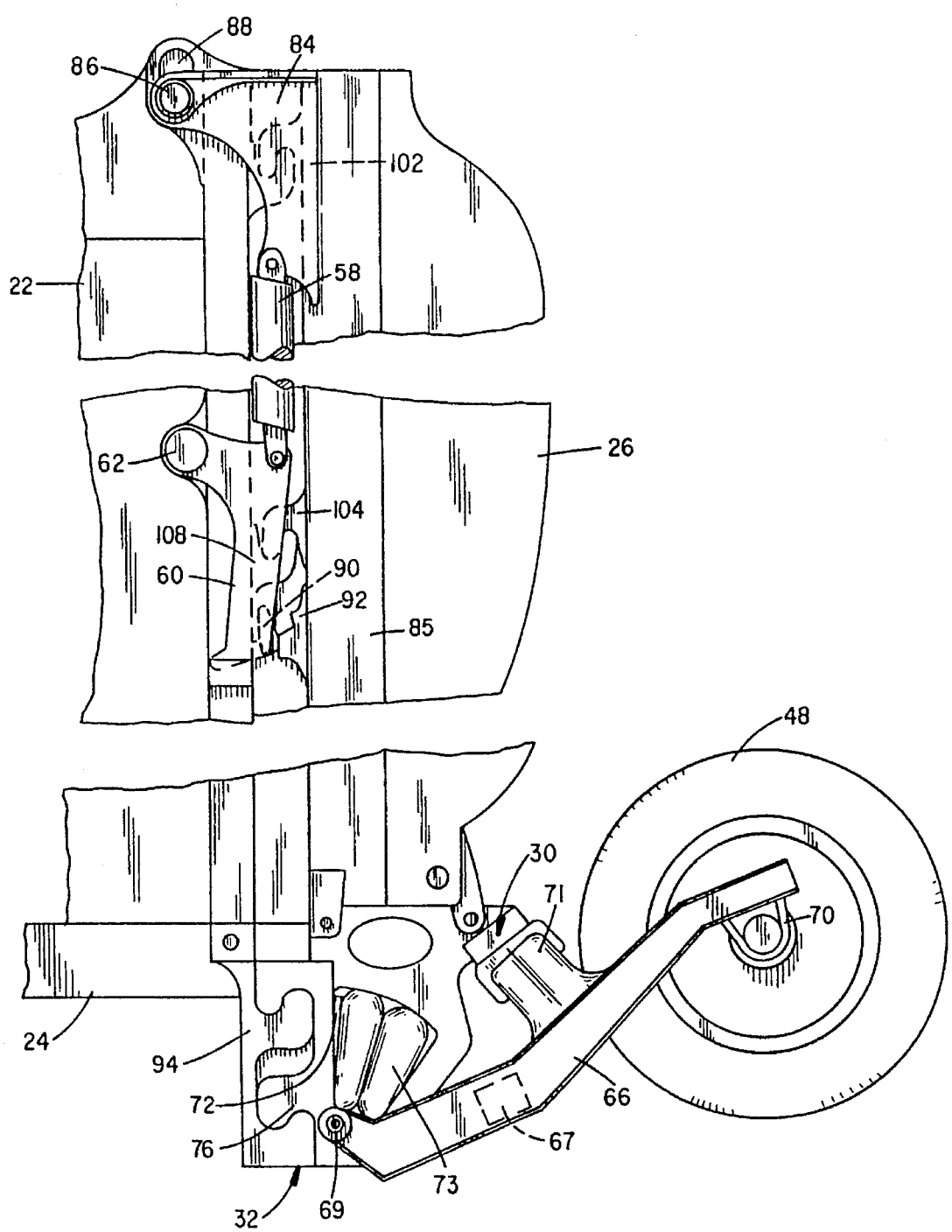
FIG. 7 is a greatly enlarged, broken fragmentary side view showing the latching link member and the hook and lock pin tag axle latching mechanism unlocked, and also showing the tailgate latching mechanism partially in dashed lines.
Figure 8:
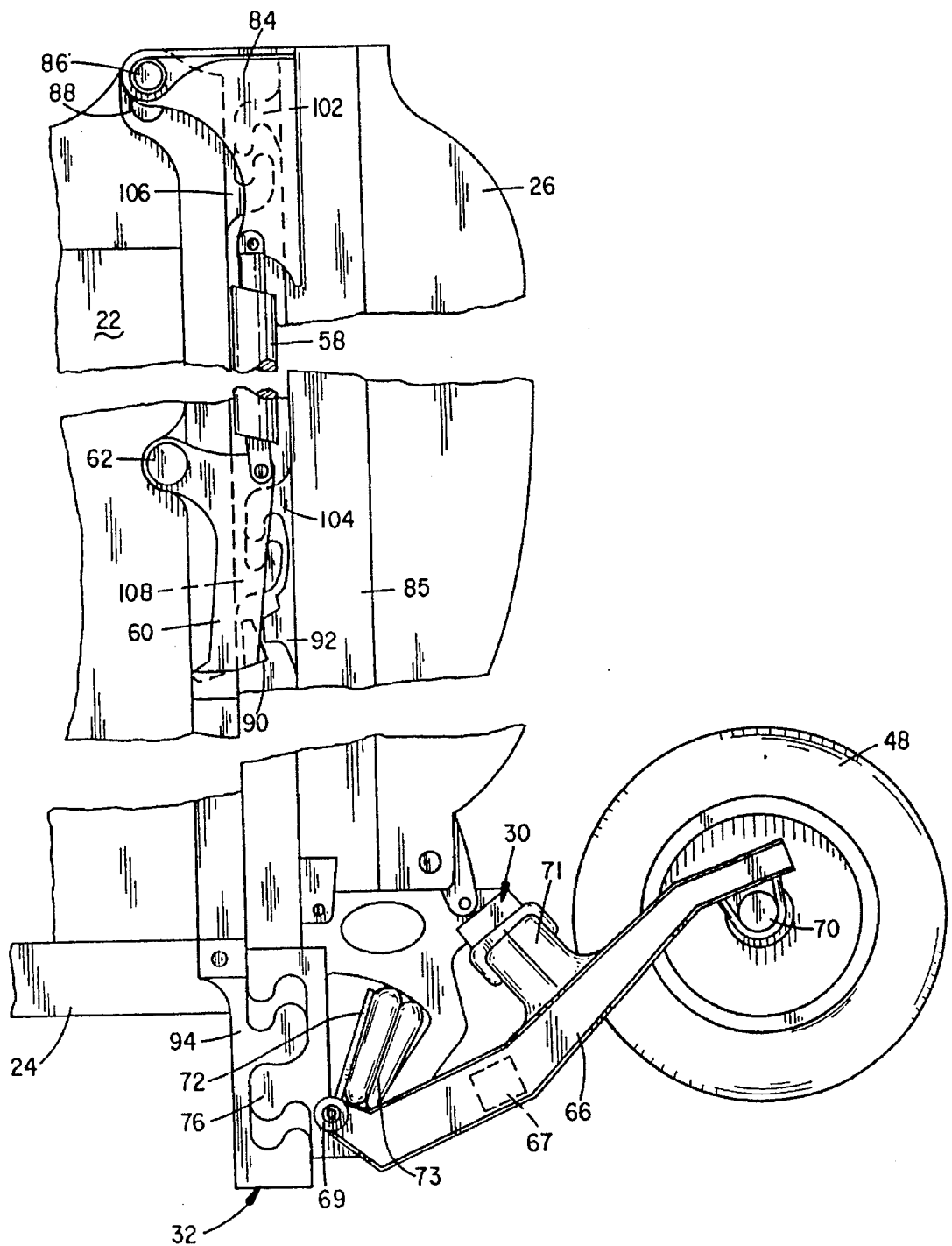
FIG. 8 is a greatly enlarged, broken fragmentary side view showing the tailgate and hook and lock pin tag axle latching mechanisms displaced vertically.
Figure 9:
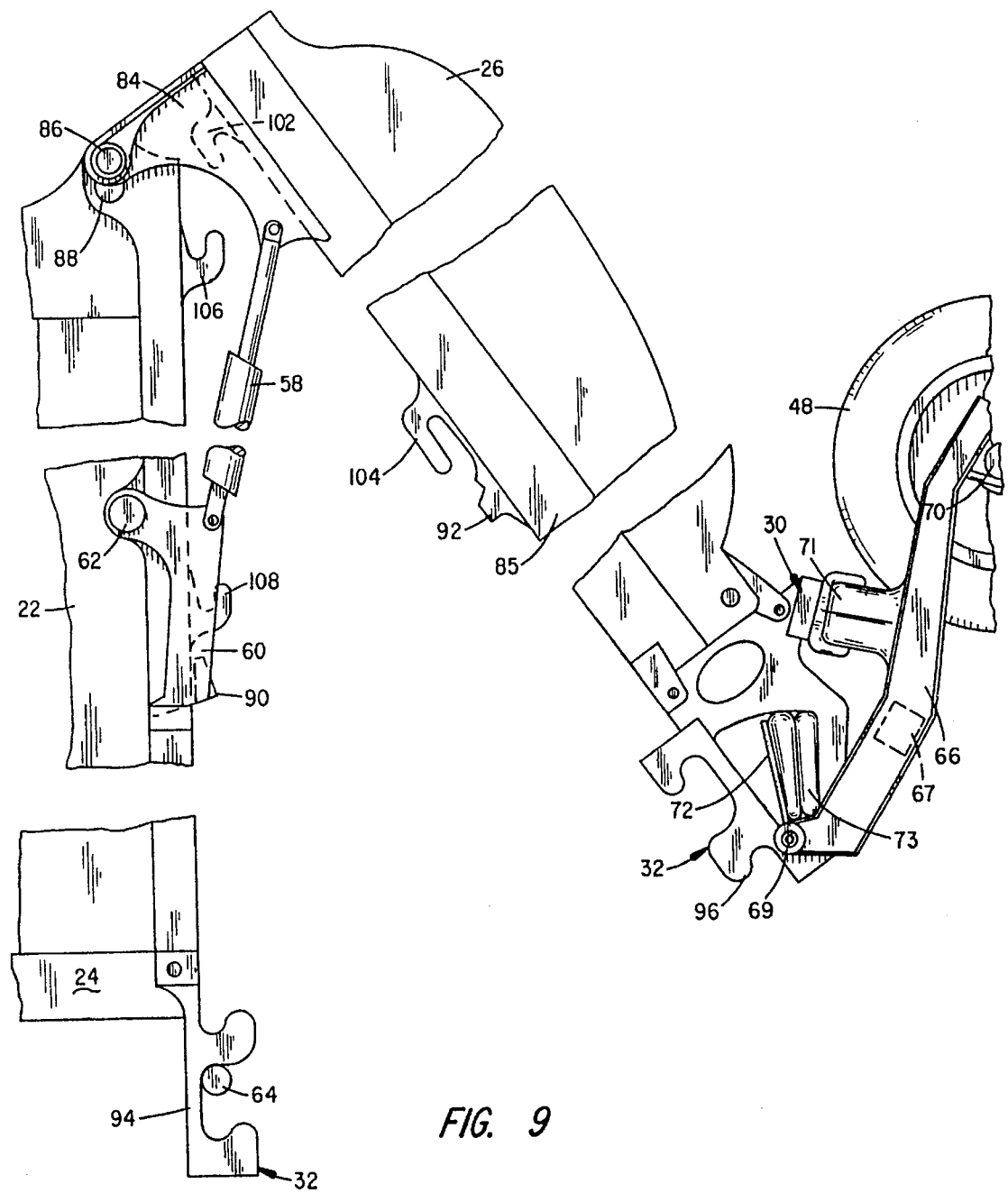
FIG. 9 is a greatly enlarged, broken fragmentary side view showing the rear of the front loading refuse truck with the tailgate and tag axle partially swung open.

The greatly enlarged views of FIGS. 7–9 illustrate how the tailgate 26 and the tag axle 30 engage the truck body 22 and frame 24 at tailgate latches and the tag axle latching mechanism 32. The frame mounted double hook 94 which is securely attached to the truck frame 24 interlocks with the corresponding tag axle mounted double hook 76 attached to the tag axle 30. Lock pin 64 is inserted between the frame mounted hook 94 and the tag axle mounted hook 76, FIG. 4, to prevent vertical movement of the tag axle 30 and to direct forces through the vehicle frame 24. The tag axle latching mechanism 32 is unlocked by disengaging the lock pin 64.

The tailgate 26 is unlocked and raised by extending hydraulic cylinder 58. This pivots latching link member 60 about pivot 62 to disengage link member vertical stop 90 from above tailgate vertical stop 92. Extending the tailgate hydraulic cylinder 58 further, vertically displaces the tailgate 26 as hinge pin 86 moves vertically in slotted opening 88. This lifts the tailgate 26 and tag axle 30 which disengages tailgate upper and lower latching members 102 and 104 from body upper and lower latching members 106 and 108. Simultaneously, tag axle mounted hook 76 is lifted from interlocking engagement with frame mounted hook 94. Extending the cylinder 58 further, swings the tailgate 26 and the tag axle 30 away from the body 22. Of course, spurs 100 also disengage from stirrups 98 as the tailgate 26 is lifted. In the raised position, FIG. 9, the tailgate 26 and the tag axle 30 stand away from the body 22 and the frame mounted double hook 94. The tailgate hinge pin 86 is at the top of vertical slot 88.

Retracting cylinder 58 reverses the process and realigns the tailgate latching members 102 and 104 with the body latching members 106 and 108 and the tag axle mounted hook 76 with the frame mounted hook 94. Retracting cylinder 58 further interlocks members 102 and 104 with members 106 and 108, and hook 76 with hook 94. The latching link member 60 is moved to vertical to lock vertical stop 90 above tailgate vertical stop 92 and lock pin 64 is slid into engagement with hooks 94 and 76 to lock the tag axle latching mechanism 32.

Figure 10:
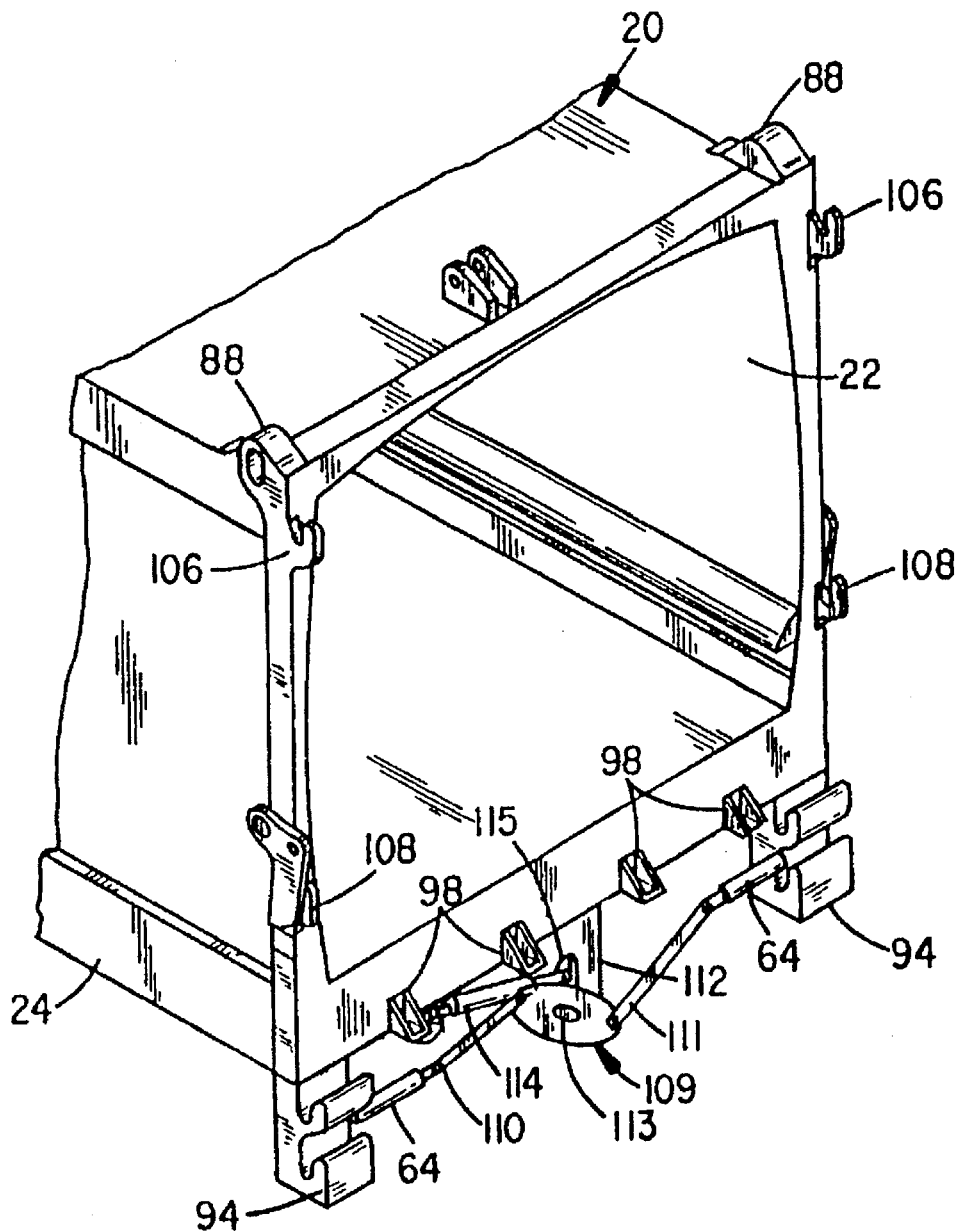
FIG. 10 is a greatly enlarged fragmentary perspective view of the rear of the front loading refuse truck with the tailgate carrying the tag axle assemblies removed and showing the slidable lock pin arrangement.

The perspective view of FIG. 10 shows a slidable lock pin linking arrangement 109 which is mounted to the truck 20 in such a way that the lock pins 64 are aligned to slide underneath the upper hook of the frame mounted hook 94. In one embodiment, the lock pin arrangement 109 includes connecting rods 110 and 111 pivotally attached between a common bell crank 112 and the lock pins 64. The bell crank 112 is connected to the truck 20 on shaft 113 and to a fluid operated cylinder, such as hydraulic cylinder 114 at pivot 115. Operating the cylinder 114 slides the lock pins 64 into and out of engagement with the tag axle latching mechanism 32. Movement of cylinder 114 may be coordinated with movement of cylinder 58 in such a way that the tag axle latches are unlocked before the tailgate latches are unlocked as the tailgate is opened and the tag axle latches are locked after the tailgate latches are locked as the tailgate is closed.

FIG. 10 also illustrates upper and lower latching members 106 and 108 on each side of the body 22. Across the bottom are four hoops or stirrups 98 and at the top are the spaced vertical slots 88 positioned on each side of the refuse vehicle 20.

Figure 11:
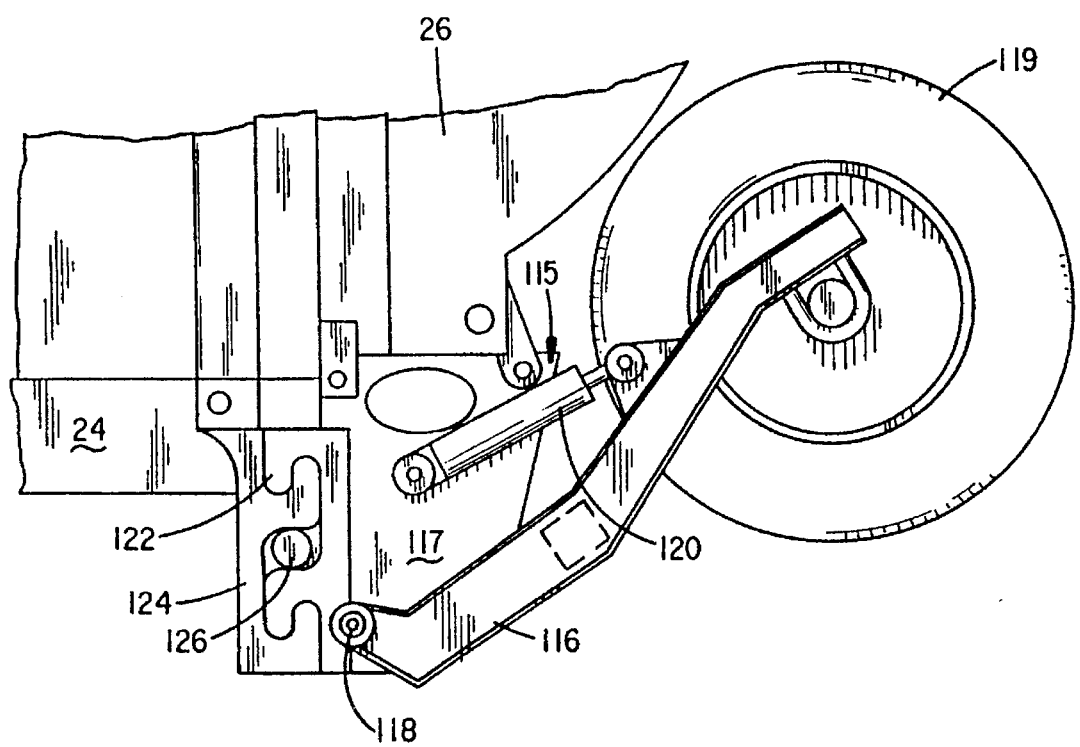
FIG. 11 is a greatly enlarged, fragmentary side view of the rear of a vehicle showing the hook and lock pin tag axle latching mechanism of the present invention attached to a double acting hydraulic cylinder operated tag axle assembly in the stowed position.
Figure 12:
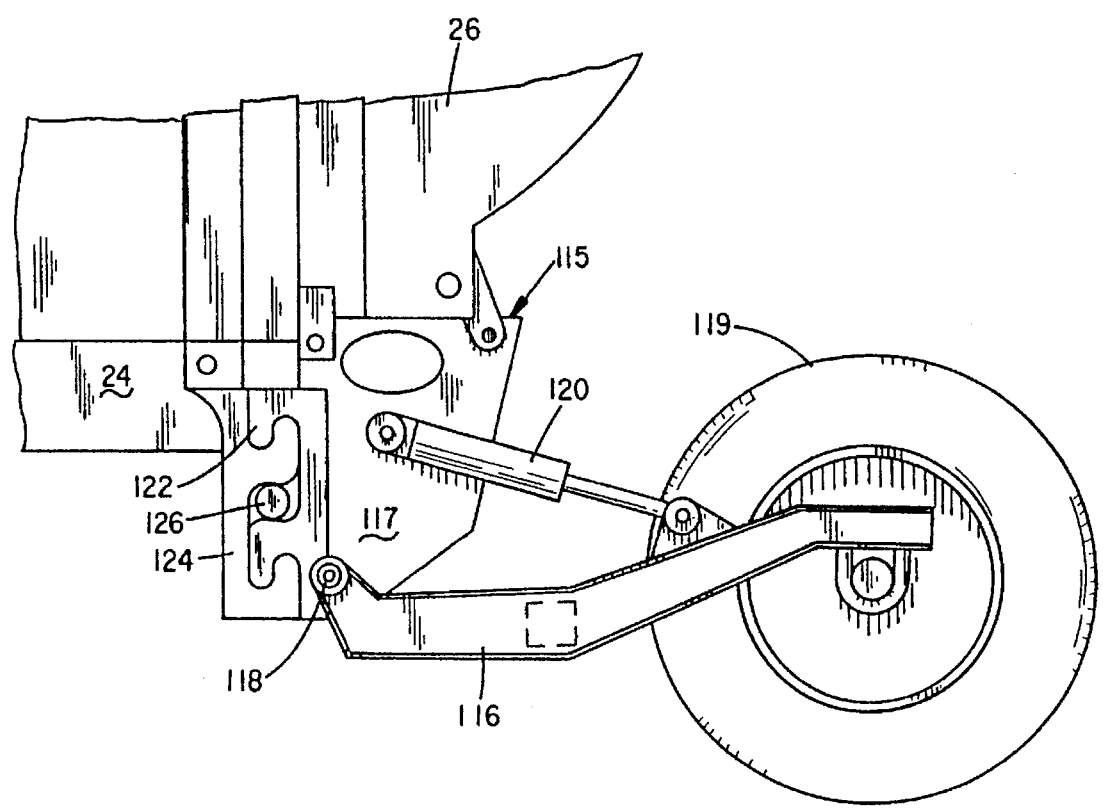
FIG. 12 is a greatly enlarged, fragmentary side view of the vehicle of FIG. 11 showing the tag axle assembly in the ground engaging position.

It will be appreciated that the pneumatic spring-operated tag axle 30 may be replaced with any suitable tag axle or tag axle deployment system, including steerable versions. For example, FIGS. 11 and 12 depict a double-acting hydraulic cylinder operated tag axle system 115 replacing the pneumatic system 30. The hydraulic system 115 includes an axle mounting lever arm 116 pivotally attached to the tag axle frame 117 with a suitable pivot pin 118. A ground engaging wheel 119 is mounted to the axle lever arm 116 which is, in turn, connected to a double-acting hydraulic cylinder 120 which is also connected to the tag axle frame 117 to move wheel 119 between a stowed position, as shown in FIG. 11, and the ground engaging position of FIG. 12. Tag axle mounted hook 122 which engages frame mounted hook 124 is attached to the tag axle frame 117. Lock pin 126 engages the hooks 122 and 124 to maintain them in a locked position and direct forces through the ground engaging wheel 119 to the frame 24. The hydraulic cylinder tag axle system 115 is loosely attached to the tailgate 26 which is raised and lowered for interlocking engagement.

Figure 13:
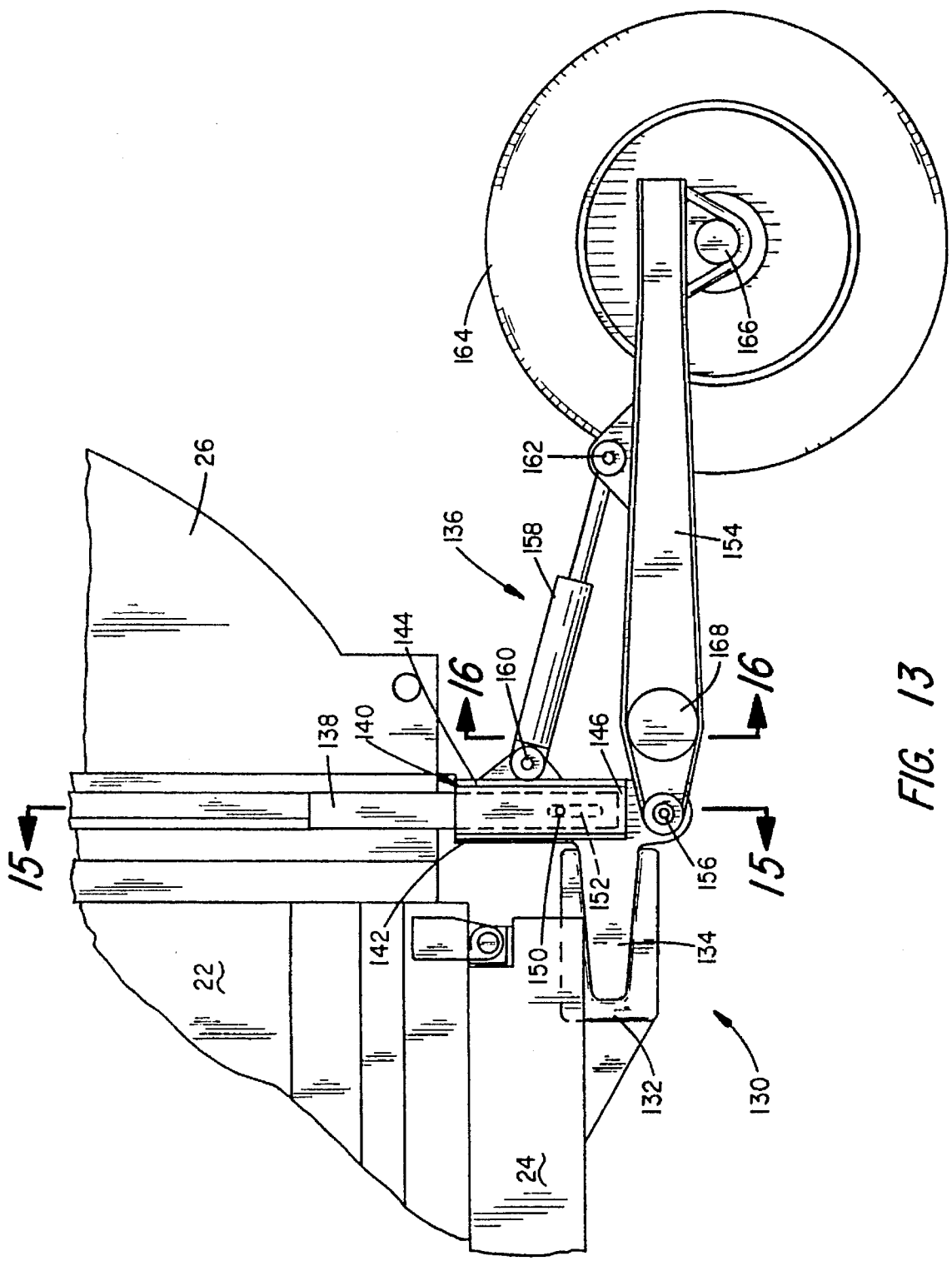
FIG. 13 is a greatly enlarged, fragmentary side view of the rear of a vehicle including a tongue and socket embodiment of the tag axle latching mechanism of the present invention shown attached to a double acting hydraulic cylinder operated tag axle system in the ground engaging position.

In FIG. 13, a tag axle latching mechanism, indicated generally at 130, includes a socket 132 and a tongue 134 engaged therein. The socket 132 is securely attached to the truck frame 24 and the tongue 134 is securely attached to a tag axle, generally at 136. The tongue 134 and socket 132 correspond such that tongue 134 is slidably received in socket 132. The tag axle 136 is adjustably connected or loosely hung from the tailgate 26 which may be the vertically displaceable tailgate illustrated as being attached to the truck body 22.

Figure 14:
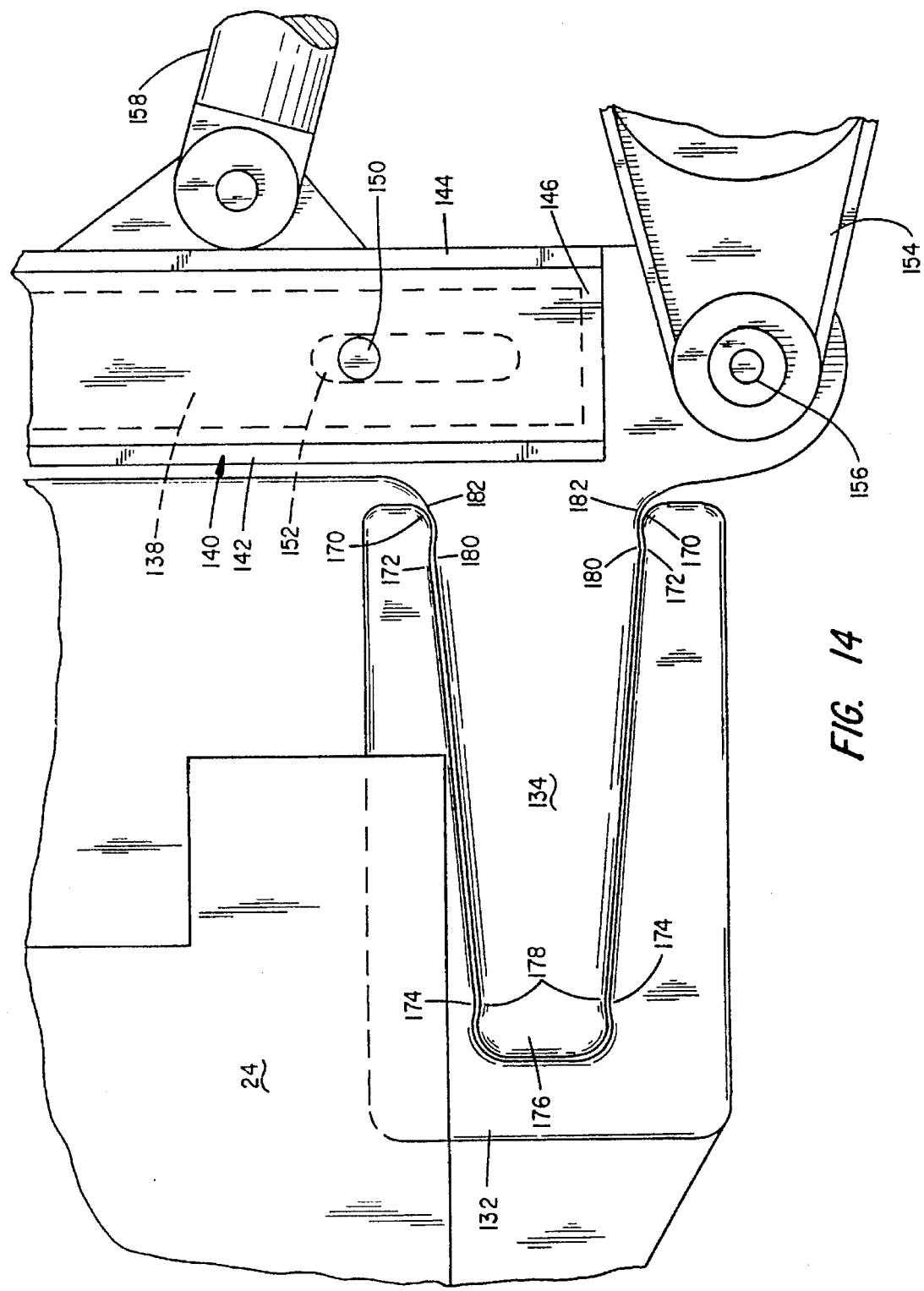
FIG. 14 is a very greatly enlarged, fragmentary side view of the tongue and socket latching mechanism of FIG. 13 showing the bolt and slot connecting the tag axle to the tailgate.
Figure 15:
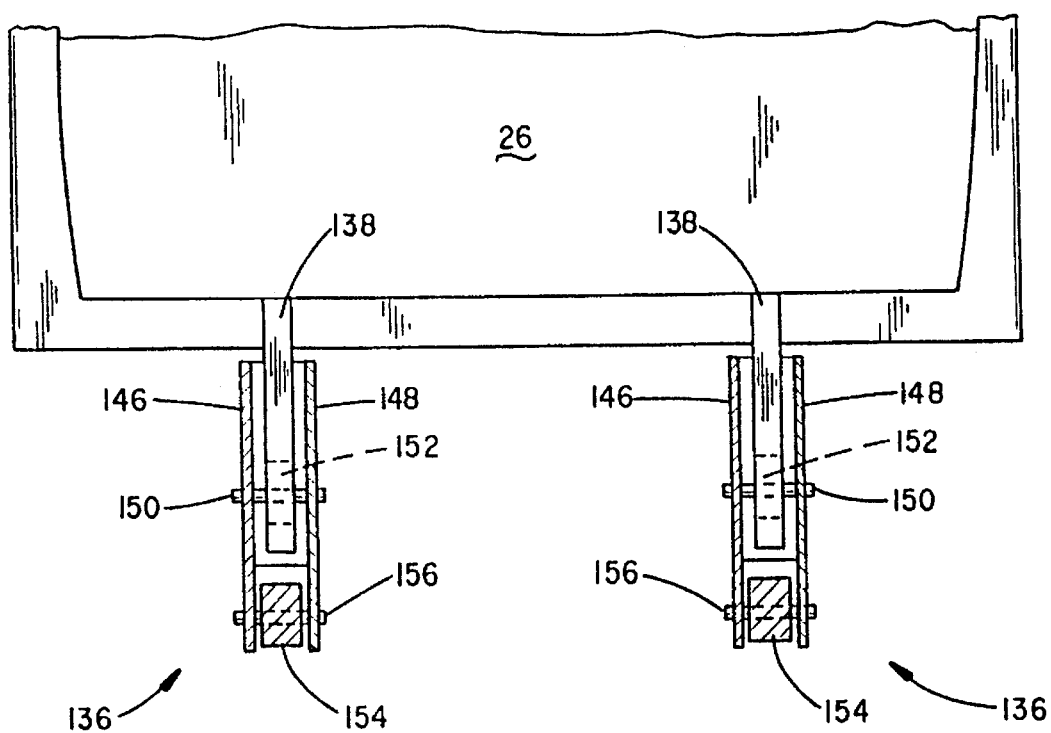
FIG. 15 is a greatly enlarged, fragmentary detail rear view of the truck of FIG. 13 taken along the line 15—15 showing the tag axle and tailgate mount.

FIGS. 13–15, further illustrate the attachment of the tag axle assembly 136 to the tailgate 26. A support bar 138 is attached to the tailgate 26 at the lower end thereof for carrying tag axle 136. The support bar 138 slidably fits into a rectangular tag axle support 140 which is an integral part of the tag axle 136. The tax axle support 140 includes front and rear slide plates 142 and 144 connected by slide plates 146 and 148 therebetween. A tag axle bolt or pin 150 attached to the side plates 146 and 148 extends through a slotted opening 152 in the lower end of the support bar 138. The tag axle bolt 150 slides freely in the slotted opening 152 such that the tag axle 136 is loosely connected to the tailgate 26.

Figure 16:
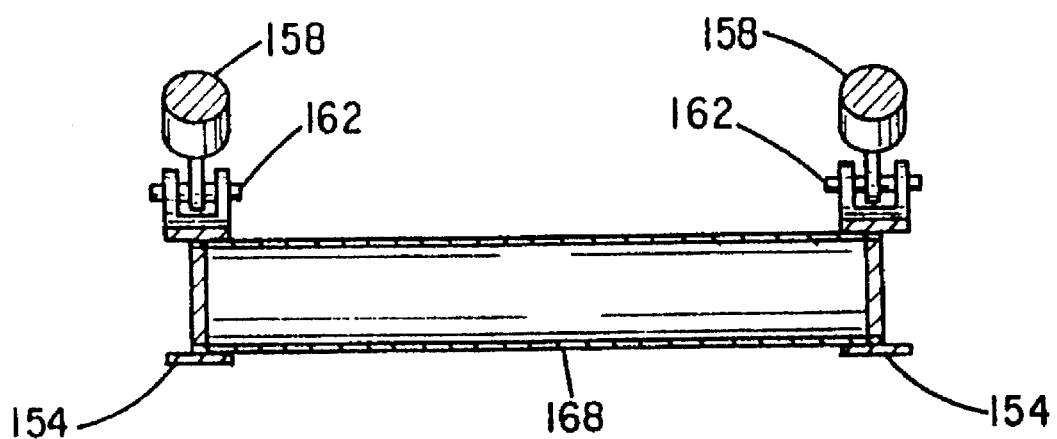
FIG. 16 is a greatly enlarged, fragmentary detail of the truck of FIG. 13 taken along the line 16—16 showing the torque tube between tag axle assemblies on each side of the truck.

The tag axle 136 may be any tag axle including those operated by pneumatic or hydraulic fluid operated actuators of the steerable or nonsteerable variety which have stub axles or through axles. As shown in FIGS. 13, 15, and 16, the tag axle 136 includes an axle mounting lever 154 pivotally attached to the side plates 146 and 148 on pin 156. A double acting hydraulic cylinder 158 is pivotally attached to the rear side plate 144 at 160 and to the axle mounting lever 154 at 162. Wheel 164 carried by a through axle 166 which is attached to the axle mounting lever 154 is moved between a ground engaging position, FIG. 13, and a raised or stowed position, FIG. 17. The torque tube 168 is attached to axle mounting levers 154 on each side of the vehicle or truck 20 for coordinating movement of the tag axle assembly 136.

As shown in FIGS. 13 and 14, the socket 132 and tongue 134 are substantially congruent. In the latched and ground engaging position, forces from the wheel 164 are transferred from the axle mounting lever 154 and hydraulic cylinder 158 through the tongue 134 and socket 132 to the frame 24. The tongue base 182 is lifted up to engage the socket mouth 170 and the tongue tip 176 is forced down to engage the interportion of the socket 132. The tongue maximum width 180 is forced against the socket maximum width 172 at the top thereof and the tongue minimum width 178 is forced against the socket minimum width 174 at the bottom thereof to latch the tongue 134 into the socket 132. This securely holds the tongue 134 in the socket 132 and transfers forces from the ground engaging tag axle 136 to the frame 24 of the truck 20. The support bar 138 is loosely fit into the tag axle support 140 and the tag axle bolt 150 is spaced from the top and bottom of the slotted opening 152 in the support bar 138 such that no forces are transferred from the ground engaging tag axle 136 to the tailgate 26.

In the inserted and stowed position the tag axle 136 hangs from the socket 132 and tongue 134 arrangement. In this situation, the lower part of the tongue base 182 and tongue maximum width 180 engages the lower portion of the socket mouth 170 and socket maximum width 172. Correspondingly, the top of the tongue tip 176 and tongue minimum width 178 engage the top of the inner portion of the inner socket 132 and socket minimum width 174. This latches the tongue 134 into the socket 132 and transfers forces from the hanging tax axle 136 to the frame 24. The loose connection between the tailgate 26 and tag axle 136 precludes transferring any forces from the hanging tag axle 136 to the tailgate 26.

Figure 17:
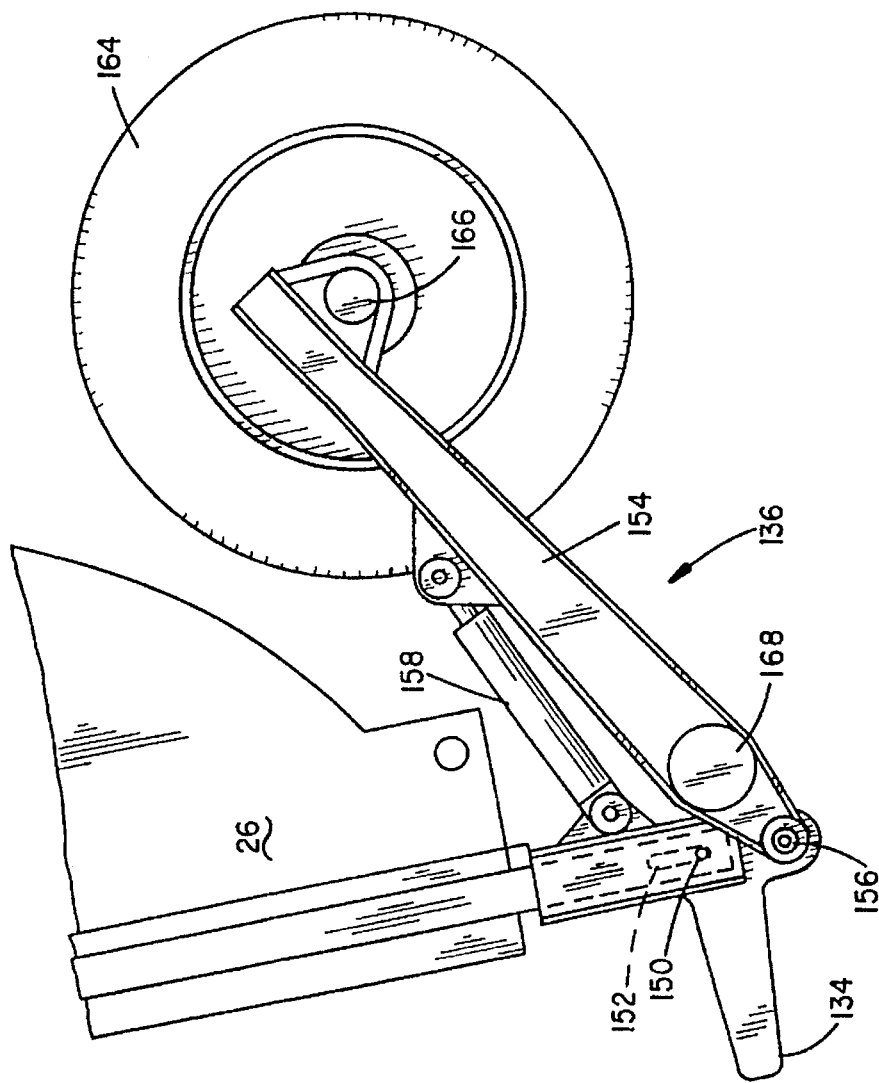
FIG. 17 is a greatly enlarged, fragmentary side view of the truck of FIG. 13 showing the tailgate and tag axle partially open.
Figure 17:
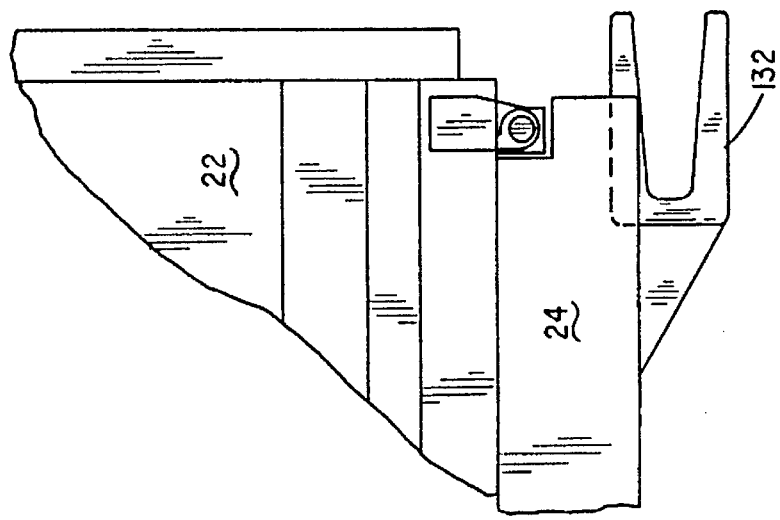

As shown in FIG. 17, the tongue 134 is disengaged from the socket 132 by lifting and raising the vertically displaceable tailgate 26. As the tailgate 26 is raised vertically, the bolt or pin 150 slides to the bottom of the slot 152 which allows the tailgate 26 to be raised while the tongue 134 remains in the socket 132. In the open position, the tag axle 136 hangs from the tailgate 26 by the bolt 150 inserted through the slotted opening 152. As shown, the tag axle 136 may be put into the stowed position by retracting the hydraulic cylinder 158 to pivot the axle mounting lever 154 about pivot 156 and raise the wheel 164 from the ground. The tailgate 26 is lowered to latch the tag axle 136 into place by inserting the tongue 134 in the socket 132. Lowering the tailgate 26 vertically engages the body and tailgate hooks.

Figure 18:
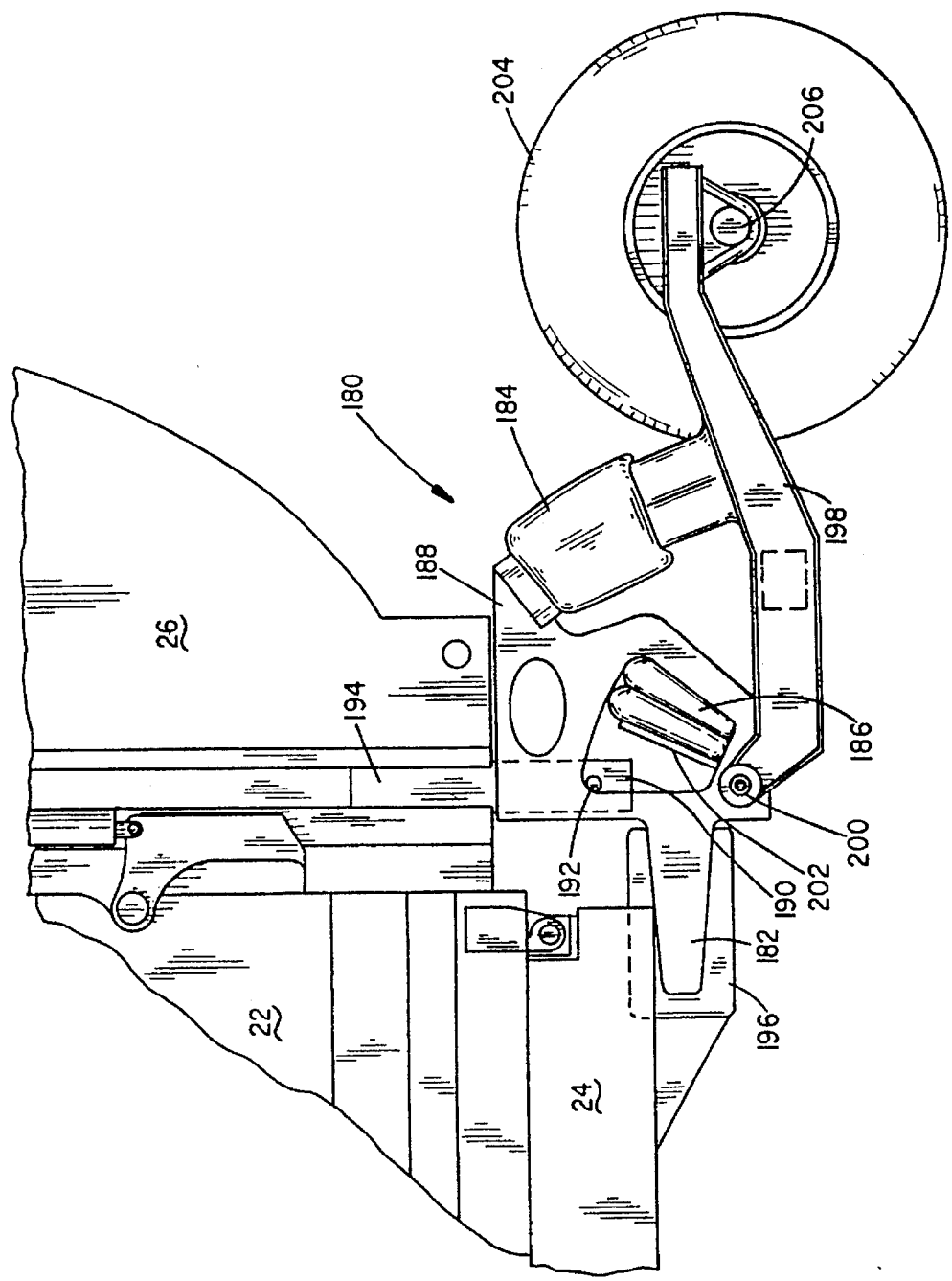
FIG. 18 is a greatly enlarged, fragmentary side view of the rear of a vehicle showing the tongue and socket tag axle latching mechanism attached to a pneumatic bellows operated tag axle assembly in the ground engaging position.
Figure 19:
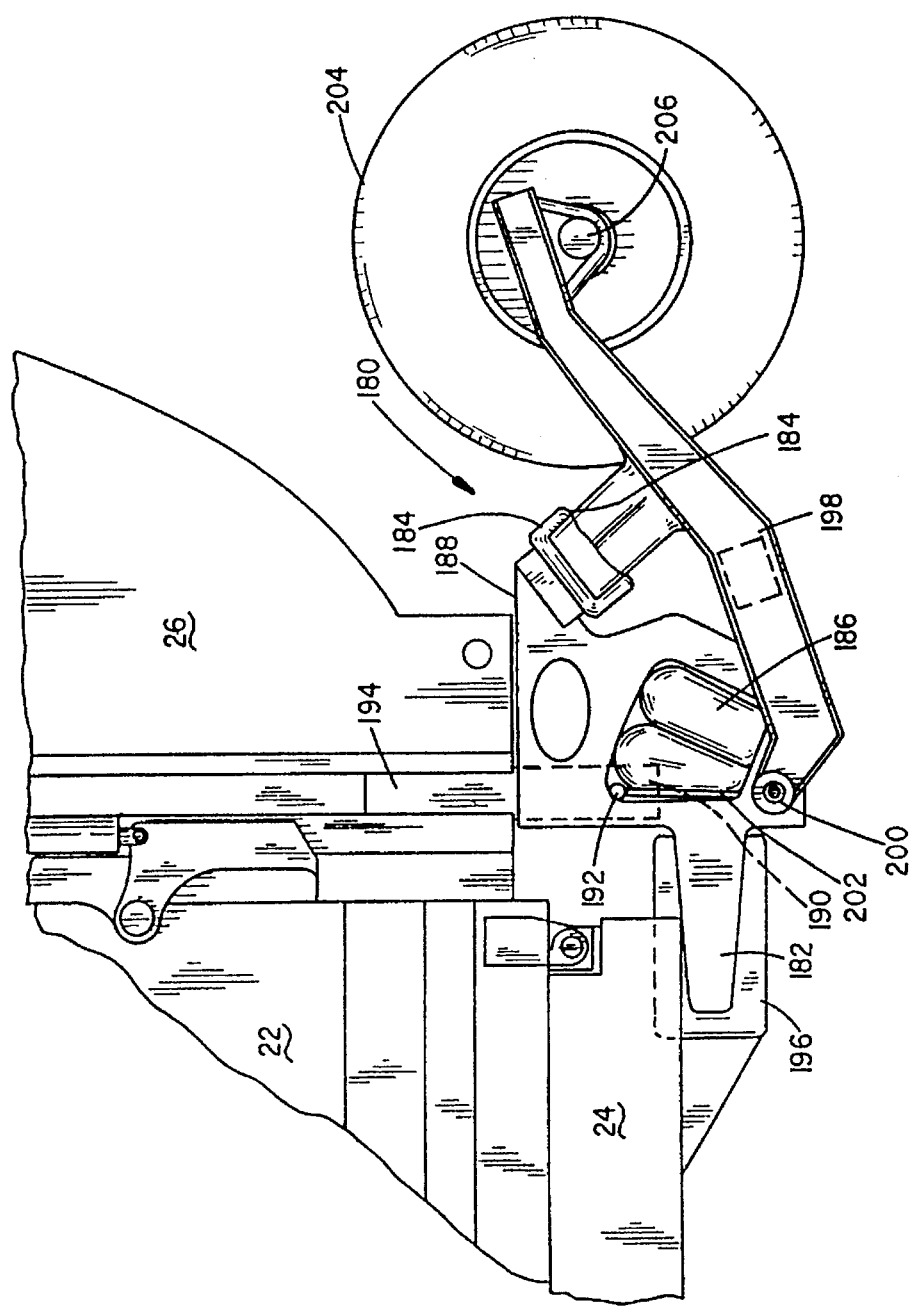
FIG. 19 is a greatly enlarged, fragmentary side view of the vehicle of FIG. 18 showing the tag axle assembly in the stowed position.

Of course, the tongue and socket embodiment may be used with many different tag axles and, as shown in FIGS. 18 and 19, the tag axle 180 including an attached tongue 182 is operated by pneumatic bellows 184 and 186 between a ground engaging position and a stowed position. The tag axle 180 includes a tag axle base 188 which is attached to the tongue 182 and a tag axle support 190 which has side plates formed into a rectangle and a tag axle bolt 192 therethrough. A support bar 194 is attached to the tailgate 26 and the tag axle bolt 192 fits through a slotted opening (not shown) in support bar 194 for slack connecting the tag axle 180 to the tailgate 26. The tongue 182 slidably fits into a socket 196 which is attached to the frame 24. The tongue and socket arrangement and the connection between the tailgate 26 and the tag axle 180 operate as previously described.

The tag axle pneumatic bellows 184 is connected to the tag axle frame 188 and the axle mounting lever 198 which is pivotally attached to the tag axle frame 188 at 200. A torque lever arm 202 is attached to the axle mounting lever 198 at the pivot 200 to pivot with the axle mounting lever 198 and pneumatic bellows 186 is attached to the tag axle frame 188 and the torque lever arm 202. A wheel 204 is attached to a axle 206 which is attached to the axle mounting lever 198. The wheel 204 is lowered to the ground engaging position by expanding pneumatic bellows 184 and retracting pneumatic bellows 186. Conversely, retracting pneumatic bellows 184 and expanding pneumatic bellows 186 raises the wheel 204 to the stowed position.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention.

What is claimed is:

1. A tag axle latching mechanism for attaching a tag axle system providing support force to a vehicle having a frame and a tailgate, comprising:

(a) mounting means for mounting a tag axle system to the tailgate so as to be carried by said tailgate; and (b) releasable latch means adapted to be attached to said tag axle system and the frame for directing supporting force provided by said tag axle through said frame.

2. The apparatus of claim 1 wherein said mounting means mounting said tag axle system to said tailgate comprises means for preventing support from being directed from said tag axle system to said tailgate.

3. The apparatus of claim 2 wherein said latch means further comprises a lock means for releasably holding said opposed matching engaging means together.

4. The apparatus of claim 3 wherein said first engaging means comprises at least one downward facing hook and said second engaging means comprises an least one upward facing hook.

5. The apparatus of claim 4 wherein said lock means comprises a slidable lock pin.

6. The apparatus of claim 5 further comprising a bell crank connected to said lock pin and a fluid operated cylinder connected to said bell crank to turn said bell crank to slidably engage and disengage said lock pin between said pair of opposed matching engaging means.

7. The apparatus of claim 2 wherein said means for preventing the support from being directed from said tag axle system to said tailgate comprises a freely adjustable connection means between said tag axle system and said tailgate in said mounting means.

8. The apparatus of claim 7 wherein said adjustable connection means comprises a vertically displaceable connection between said tag axle system and the tailgate.

9. The apparatus of claim 1 wherein said latch means comprises opposed matching engaging means including a first engaging means attached to said tag axle system and a second engaging means attached to said frame.

10. The apparatus of claim 9 wherein said first engaging means is a tongue and said second engaging means is a socket for receiving the tongue.

11. The apparatus of claim 10 wherein said tongue is self-latching in said socket.

12. A tag axle latching mechanism for attaching a tailgate-mounted tag axle system to a work vehicle having a frame and tailgate, said tag axle system providing support to said vehicle through said frame, comprising:

(a) a tag axle system for providing additional support for said work vehicle;

(b) means for operating said tag axle system between a stowed and deployed vehicle support providing position;

(c) mounting means connected to said tailgate and said tag axle system for mounting said tag axle system to said tailgate; and (d) releasable latch means attached to said tag axle system and said frame for directing support provided by said tag axle through said frame when said tag axle is in the deployed position.

13. The apparatus of claim 12 further comprising freely displaceable means in said mounting means for to preclude support provided by said tag axle from being applied to said tailgate.

14. The apparatus of claim 13 wherein said releasable latch means further comprises mechanized releasable locking means.

15. The apparatus of claim 13 further comprising tailgate operating means for opening and shutting said tailgate and wherein operation of said tailgate latches and releases said releasable latch means.

16. A tag axle latching mechanism for attaching a tailgate-mounted tag axle system to a work vehicle having a frame and a tailgate, said tag axle system providing support through said frame, comprising:

(a) a tag axle system for providing additional support for said work vehicle;

(b) means for operating the tag axle system between a stowed and supporting ground engaging position;

(c) tag axle mounting means connected to said tailgate and said tag axle system for mounting said tag axle to said tailgate;

(d) latch means attached to said tag axle system and said frame for directing support provided by said tag axle system through said frame; and (e) wherein said tag axle mounting means includes freely displaceable connecting means for precluding transfer of support provided by said tag axle system to said tailgate.

17. The apparatus of claim 16 wherein said latch means comprises opposed matching engaging means including a first engaging means attached to said tag axle system and a second engaging means attached to said frame.

18. The apparatus of claim 17 where said latch means further comprises a lock means for releasably holding said first and second engaging means together.

19. The apparatus of claim 18 wherein said first engaging means comprises at least one downward facing hook and said second engaging means comprises at least one upward facing hook.

20. The apparatus of claim 19 wherein said first and said second engaging means further comprise a plurality of hooks.

21. The apparatus of claim 20 wherein said lock means comprises a slideable lock pin.

22. The apparatus of claim 21 further comprising a bell crank connected to said lock pin and a fluid operated cylinder connected to said bell crank to turn said bell crank to slidably engage and disengage said lock pin between said pair of opposed matching engaging means.

23. The apparatus of claim 19 wherein said lock means comprises a slideable lock pin.

24. The apparatus of claim 17 wherein said first engaging means is a tongue and said second engaging means is a socket for receiving the tongue.

25. The apparatus of claim 24 wherein said tongue is self-latching in said socket.

26. The apparatus of claim 25 wherein both said tongue and said socket have non-parallel mating surfaces.

27. The apparatus of claim 16 wherein both said tongue and said socket have non-parallel mating surfaces.

28. A tag axle mounting and latching mechanism for a vehicle comprising:

(a) a vehicle having a frame;

(b) a vertically displaceable tailgate pivotally attached to the vehicle for being displaced vertically from a closed position and pivoted to an open position;

(c) means for operating said tailgate;

(d) a tag axle system for providing support for said vehicle;

(e) releasable latch means attached to said tag axle system and said frame for directing support provided by said tag axle system through said frame;

(f) mounting means for mounting said tag axle system to said tailgate such that said tag axle is carried by said tailgate;

(g) wherein said releasable tailgate is operated between said closed and said open positions; and (h) wherein said mounting means further comprises means to preclude transfer of support provided by said tag axle system to said tailgate.

29. The apparatus of claim 28 wherein said latch means engages and disengages as said tailgate is displaced vertically.

30. The apparatus of claim 29 wherein said latch means further comprises mechanized lock means for releasably locking said tag axle system to said frame.

31. The apparatus of claim 28 wherein said mounting means comprises a vertically displaceable mounting connection.

* * * * *